Jan. 8, 1957 M. W. GUYER 2,776,612
ROTARY ROD WEEDER DRIVE
Filed Oct. 16, 1953 2 Sheets-Sheet 1

INVENTOR.
Morris W. Guyer
BY
Atty.

Jan. 8, 1957 M. W. GUYER 2,776,612
ROTARY ROD WEEDER DRIVE
Filed Oct. 16, 1953 2 Sheets-Sheet 2
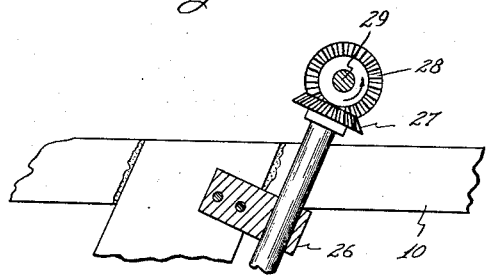
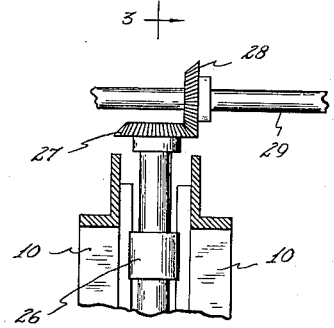
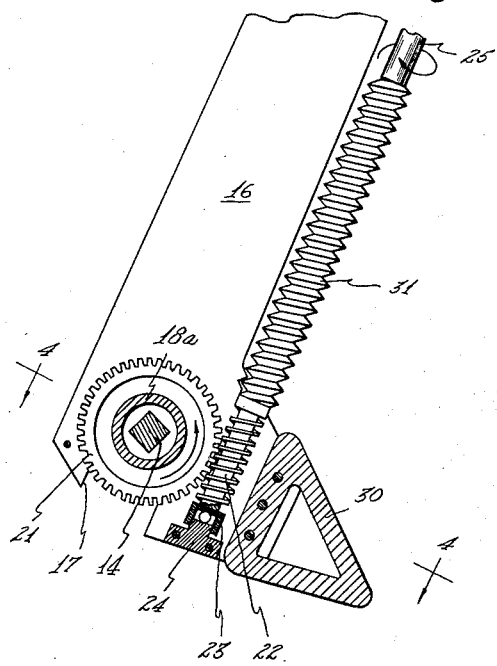
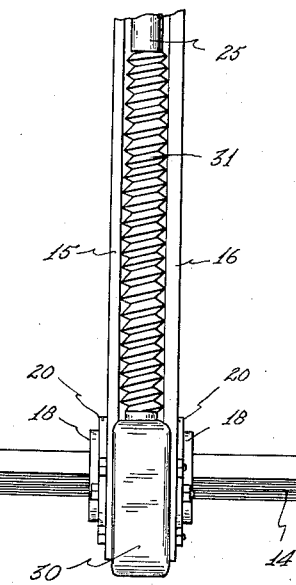
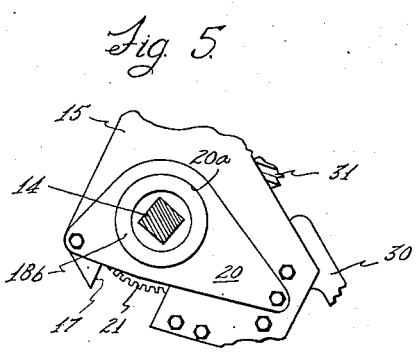
INVENTOR.
Morris W. Guyer
BY
Atty.

United States Patent Office 2,776,612
Patented Jan. 8, 1957

2,776,612
ROTARY ROD WEEDER DRIVE

Morris W. Guyer, Spokane, Wash., assignor to Calkins Manufacturing Company, Spokane, Wash.

Application October 16, 1953, Serial No. 386,464

5 Claims. (Cl. 97—42)

My present invention relates to improvements in a rotary rod weeder drive.

In tillage implements of the rod weeder type the cultivation of the soil is accomplished by pulling a square rotary rod through the soil a few inches below the ground level. The rod, rotating in a direction opposite to the direction of travel, loosens the soil and uproots weeds and the like and leaves them on the surface of the ground to dry.

It is preferable to drive the rod from the center of the implement, and support the ends by standards depending from the frame of the implement. The problem arising from this type of drive, is that the trash resulting from former crops and the weeds uprooted by the portion of the rod near the center drive tend to collect on the drive mechanism. This collection of trash not only hinders the function of the drive mechanism, but may drag along through the loose soil collecting more weeds until the machine is so clogged that it cannot function at all. The accumulation of trash also causes a furrow to form behind the implement, which is undesirable and very susceptible to soil erosion.

It is the purpose of this invention, to provide a suitable center drive mechanism for the rotary rod, which will clear itself of trash as it drives the rod, in a new and simple fashion.

My invention utilizes a worm and gear drive for the rotary rod. The worm gear is mounted on the rod and supported between two depending standards attached to the main frame of the implement. A nose piece is attached between the standards in front of the gear to protect it as the implement moves through the soil. The drive shaft for the rod extends upwardly in front of the depending standards and is driven from the top by two bevel gears, one mounted on the drive shaft and another mounted on a cross shaft which may receive power through a chain and sprocket system connected with one of the wheels of the vehicle, or from any other suitable source. The drive shaft has at its lower end, a worm which meshes with the worm gear to rotate the rod.

In order to keep trash from accumulating on the mechanism, a spiral or screw portion is formed on the drive shaft above the worm. The spiral section is so formed that when the drive shaft rotates, the trash in contact with the sprial on the shaft is moved upward and to one side until it frees itself and drops off out of the way.

The nature and advantages of my invention will appear more fully from the following description and the accompanying drawings wherein a preferred form of the invention is shown. The drawings and description are illustrative only, however, and should not be considered as limiting the invention except insofar as it is limited by the claims.

In the drawings:

Figure 2 is an enlarged view, in front elevation, of the drive mechanism;

Figure 3 is a sectional view taken substantially on the line 3—3 of Figure 2;

Figure 5 is a fragmentary side view of the center drive illustrating the support for the drive gear.

Figure 1:
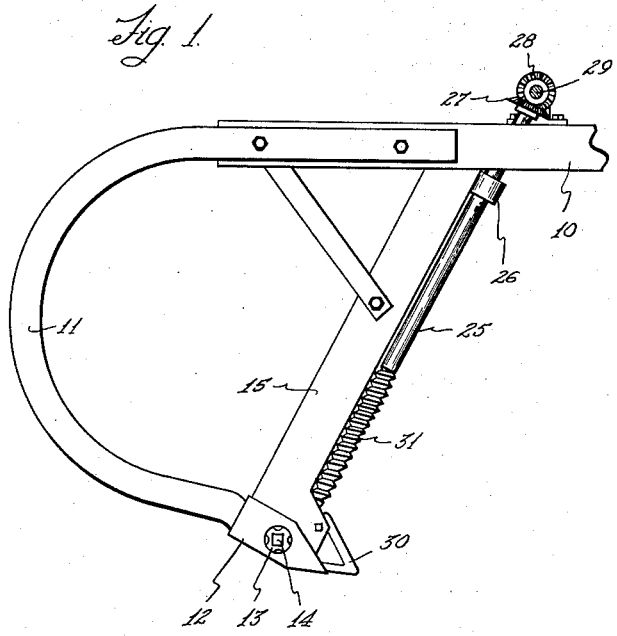
Figure 1 is a partial side view of a rotary rod weeder employing my invention.

Referring now to the drawings and to Figure 1 in particular, my invention is shown in cooperation with a standard rotary rod weeder, the main frame of which is generally indicated by the number 10. Rod supporting bars 11 are attached to the frame 10, and extend downwardly into contact with the soil. At the lower edges of the bars 11, shoes 12 are attached, which mount bearings 13. A square rod 14 extends transversely of the implement and is rotatably secured by the bearings 13 in the shoes 12.

The drive mechanism for the rod 14 is located between the bars 11, near the center of the rod 14. Two supporting standards 15 and 16 are secured to the frame 10 and extend downwardly and rearwardly. The standards 15 and 16 have rectangular slots 17 extending upwardly from their lower edges which are adapted to receive bearing members 18. These bearings 18, and their support means are shown more clearly in my application, Ser. No. 386,463, for tillage implement. Each bearing member 18 is formed of three portions, a small cylindrical portion 18a at one face, a substantially larger concentric cylindrical portion 18b at the opposite face, and between these, an intermediate squared portion 18c. The squared portions 18c of the bearings 18 are adapted to fit into the rectangular slots 17 in the standards 15 and 16. The bearings 18 are supported in the slots 17 by plates 20 which have apertures 20a to receive the large circular portions 18b of the bearing 18. The plates 20 are bolted to the standards 15 and 16. The bearings 18 have an inner bearing surface to receive the hub portions of a worm gear 21. The worm gear 21 has a squared central aperture to receive the rod 14.

Figure 4:
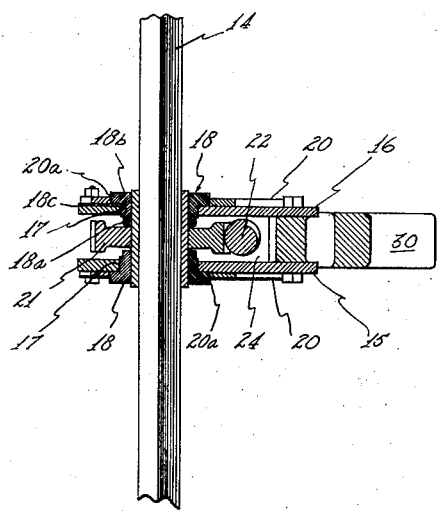
Figure 4 is a sectional view taken on the line 4—4 of Figure 3.

In order to drive the gear 21, I provide a worm 22, which extends downwardly in front of the gear 21 (see Figures 3 and 4) and meshes with it to produce rotation. The worm 22 has, at its lower end, an enlarged, hollowed bearing portion 23, which receives a thrust bearing 24. The thrust bearing 24 is secured between the standards 15 and 16, and forms a spacer for these two members. The upper end of the worm 22 is connected to a drive shaft 25, which extends down in front of the standards 15 and 16 as shown in Figures 2 and 3. The drive shaft 25 is supported near its upper end by a bearing member 26, which, like bearing 24, is mounted between the standards 15 and 16. A bevel gear 27 is mounted on the upper end of the drive shaft 25, and it cooperates with a second, driven, bevel gear 28 to produce rotation of the shaft 25. The bevel gear 28 is mounted on a cross shaft 29, which receives power either from a power take-off on the towing vehicle or from a supporting wheel (not shown) of the frame 10. The method of driving the shaft 29 forms no part of my invention, and therefore is not shown in the drawings.

A nose piece 30 is bolted to the lower front edges of the standards 15 and 16, to provide a path through the soil, for the drive mechanism to follow, and to protect the worm 22 and the worm gear 21 from being clogged as they drive the rotary rod.

In order to keep the drive shaft 25 and the standards 15 and 16 from becoming entangled with loose trash as the implement is towed through the fields, I provide a spiral screw portion 31 on the drive shaft 25. This spiral screw portion 31 is located immediately above the worm 22, and extends up the drive shaft 25 for a considerable distance. The spiral 31 is formed in the shaft 25 in the same direction as the worm 22, so that as the worm is rotated to turn the worm gear in the direction indicated in Figure 3, the spiral 31 rotates in the same direction to lift anything in contact with it up toward the main frame 10 of the device.

The operation of the device is simple. As the rod 14 is driven, the spiral portion of the shaft 25 is rotated. Trash that is caught on the nose piece 30 is forced upward by the soil moving past the nose piece 30. When the trash reaches the spiral portion of the shaft 25, it is elevated and urged sidewise by the spiral until it becomes free, and then drops off. The spiral continuously lifts the congestion of trash at the front of the drive mechanism, and pushes it to one side so it will pass by the standards.

It is believed that the nature and advantage of my invention appear fully from the foregoing description and the accompanying drawings.

Having thus described my invention, I claim:

1. In a soil cultivating implement utilizing a rotating rod drawn transversely through the soil, a drive mechanism comprising a worm gear mounted on the rotary rod, a depending frame attached to the main frame of the implement and having at its lower end means rotatably supporting said worm gear, a drive shaft extending downwardly in front of the depending frame, a worm attached to the lower end of said drive shaft, said worm being meshed with said worm gear, a spiral portion on the drive shaft, said spiral portion being located above the worm, means for rotatably supporting the drive shaft, and means for rotating the drive shaft.

2. In a soil cultivating implement utilizing a rotating rod drawn transversely through the soil, a drive mechanism comprising a worm gear mounted on the rotary rod, a depending frame attached to the main frame of the implement, bearing members attached to the lower portion of the depending frame, said bearing members rotatably supporting the worm gear, apertures in the bearing members to allow the rotary rod to pass through, a drive shaft extending downwardly in front of the depending frame, a worm attached to the lower end of said drive shaft, said worm being meshed with said worm gear, a sprial screw portion on the drive shaft above the worm, means for supporting the drive shaft, and means for rotating the drive shaft.

3. In a soil cultivating implement utilizing a rotating rod drawn transversely through the soil, a drive mechanism comprising a worm gear mounted on the rotary rod, a depending frame attached to the main frame of the implement, bearing members attached ot the lower portion of the depending frame, said bearing members rotatably supporting the worm gear, apertures in the bearing members to allow the rotary rod to pass through, a drive shaft extending downwardly in front of the depending frame, a worm attached to the lower end of said drive shaft, said worm being meshed with said worm gear, a spiral screw portion on the drive shaft above the worm, means for supporting the drive shaft, and means for rotating the drive shaft, said last named means comprising a bevel gear attached to the end of the drive shaft opposite the worm, a second bevel gear meshed with the first, a cross shaft mounted on the implement frame and carrying said second bevel gear, and means for rotating said cross shaft.

4. In a soil cultivating implement utilizing a rotary rod drawn transversely through the soil, a drive mechanism comprising a worm gear mounted on the rotary rod, a rigid depending frame secured to the main frame of the implement, bearing means at the lower end of said rigid depending frame supporting said worm gear, a drive shaft extending downwardly and rearwardly in front of said rigid depending frame, means rotatably supporting said shaft on the depending frame, a worm attached to the lower end of said drive shaft being meshed with said worm gear, a spiral portion on said drive shaft above said worm operable to lift trash engaged thereby, and means to rotate said drive shaft.

5. In a soil cultivating implement utilizing a rotary rod drawn transversely through the soil, a drive mechanism comprising a worm gear mounted on the rotary rod, a rigid depending frame secured to the main frame of the implement, bearing means at the lower end of said rigid depending frame supporting said worm gear, a drive shaft extending downwardly and rearwardly in front of said rigid depending frame, means rotatably supporting said shaft on the depending frame, a worm attached to the lower end of said drive shaft being meshed with said worm gear, a spiral portion on said drive shaft above said worm operable to lift trash engaged thereby, and means to rotate said drive shaft, said last named means comprising a bevel gear attached to the upper end of the drive shaft, a second bevel gear meshed with the first named bevel gear, a cross shaft mounted on the implement frame and carrying said second bevel gear, and means for rotating said cross shaft.

References Cited in the file of this patent

UNITED STATES PATENTS

| | | |
|---|---|---|
| 15,919 | Bills | Oct. 21, 1856 |
| 417,930 | Metz | Dec. 24, 1889 |
| 2,227,527 | Wolfe | Jan. 7, 1941 |
| 2,355,229 | Miller | Aug. 8, 1944 |
| 2,398,385 | Mintken | Apr. 16, 1946 |
| 2,506,577 | Calkins | May 9, 1950 |
| 2,596,270 | Miller et al. | May 13, 1952 |